Jan. 22, 1946.  G. P. TORBURN  2,393,431
LOCKING AND SEALING MEANS FOR BLIND BOLT CONNECTION
Filed Sept. 7, 1944
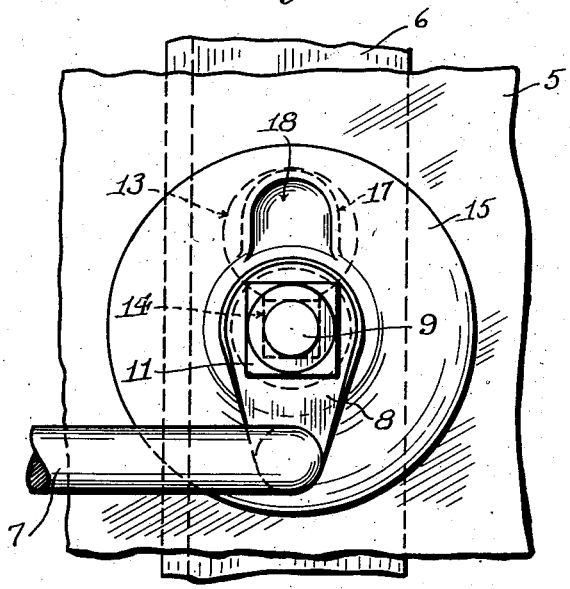
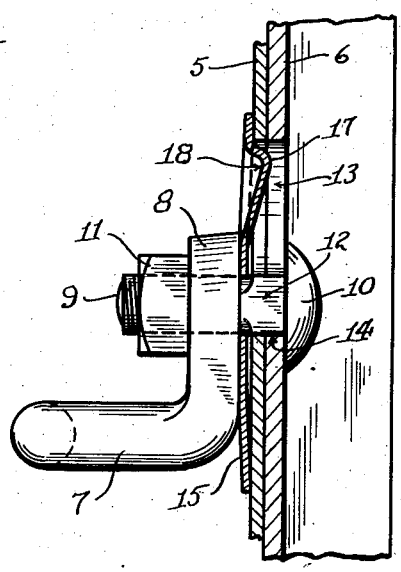
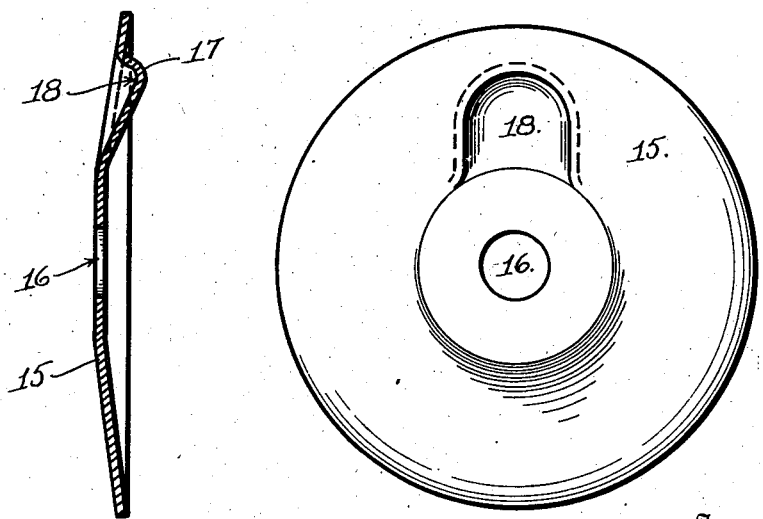
Inventor
Guster P. Torburn
by
William D. Booth Jr.
Attorney Patented Jan. 22, 1946

2,393,431

UNITED STATES PATENT OFFICE 2,393,431

LOCKING AND SEALING MEANS FOR BLIND BOLT CONNECTIONS

Gustav P. Torburn, San Carlos, Calif.

Application September 7, 1944, Serial No. 552,951

3 Claims. (Cl. 85—50)

The present invention relates to locking and sealing devices, and more particularly to means for locking a bolt in a key hole slot and for sealing the slot.

In some forms of blind bolt connections, a key hole shaped slot or aperture is made in the supporting member or plate, the head of the bolt is inserted through the enlarged portion of the slot, the bolt is then shifted sidewise so that its shank rests in the narrow portion of the slot and its head engages the rear surface of the plate, the attached member is then fitted over the protruding end of the bolt, and the nut is screwed home to hold the parts together. A washer is used to cover the exposed portion of the slot. If the nut works loose the bolt may shift so that its head comes out through the enlarged slot portion.

The principal object of this invention is to provide a simple means which performs two functions, viz: to prevent the bolt from shifting and to seal the exposed portion of the slot. Another object is to provide a locking and sealing member which has some resilience, so that its functions are maintained even if the nut works slightly loose, and so that it continues to exert pressure on the loosened nut to retard further unscrewing. Another object is to provide a device which is cheap to manufacture and easy to use. Other objects and advantages of the invention will become apparent from the following description of a preferred embodiment thereof, which should be read with the understanding that changes, within the scope of the claims hereto appended, may be made in the form, construction and arrangement of the several parts, without departing from the spirit of the invention.

The invention is herein described and illustrated as applied to a blind bolt connecting a grab iron or hand hold with the outside of a lined freight car. Such grab irons are frequently damaged by striking against other cars or trucks or stationary objects, and require frequent replacement. In order to avoid the necessity of tearing out or cutting through the lining of the car, blind bolt connections are used, which can be made entirely from the outside. The vibration of the car tends to loosen the nut, whereupon the bolt may come out and the grab iron will become a hazard to a man attempting to use it, and if both ends become loose, the grab iron will be lost. The bolt hole must be sealed to prevent moisture from entering the wall of the car and causing deterioration of its structure.

By the use of a device embodying the present invention, the loosening of the connection is prevented and the hazard attendant thereon is eliminated, and at the same time, the bolt hole is adequately and permanently sealed.

The invention, however, is not limited to the use herein described, but may be used in any application where a blind bolt connection is desirable.

In the accompanying drawing,

Fig. 1 is an outside front elevation of a blind bolt connection including my locking and sealing means.

Fig. 2 is a part sectional side elevation of the same.

Figs. 3 and 4 are respectively a vertical section of the locking and sealing member and a front elevation thereof.

The reference numeral 5 designates the outer sheathing of the wall of a freight car, in this case a steel sheet, and 6 is one of the vertical frame members of said wall. 7 is a grab iron or hand hold, only one end portion of which is shown. The grab iron 7 has an ear 8 at each end (only one being shown) which is secured to the wall of the car by a bolt 9 having a head 10 at its inner end, a nut 11 at its outer end, and a square shank portion 12 near said head.

A key hole opening is formed through the sheathing 5 and the adjacent flange of the frame member 6, said hole having an enlarged round upper end 13 and a narrow rectangular slot 14 at its lower end. The end 13 is large enough to permit the head 10 of the bolt to pass through, and the slot 14 fits closely about the square shank 12 of the bolt to keep it from turning. The head of the bolt is inserted from the outside through the round end 13, and the bolt is then shifted downwardly until its square shank 12 seats in the narrow slot 14.

My locking and sealing means comprises a plate 15, which may be circular as shown or any other desired shape, with a hole 16 to fit over the shank of the bolt 9. Above the hole 16, the plate is formed with a lug or projection 17 on its inner face, of a size and shape to fit into the end 13 of the key hole. This inward projection may easily be formed by a die which offsets a portion of the plate inwardly, making a corresponding depression 18 in the outer face. The plate is slightly dished, its center portion being raised toward the outer face, to give it resilience when compressed by the bolt.

The plate 15 is placed over the projecting shank of the bolt with the projection 17 fitting into the end 13 of the key hole. The ear 8 of the grab iron is then placed over the shank of the bolt against the plate 15, and the nut 11 is screwed up tight. The projection 17 on the plate prevents shifting of the bolt upwardly, and its resilience maintains pressure on the nut so that the latter will not work loose. The outer edge of the plate covers the entire key hole opening and bears tightly against the outer surface of the sheathing 5, so that the opening is entirely sealed against the entrance of moisture and dirt.

I claim:

1. Locking and sealing means for a blind bolt connection of the type having an elongated aperture through which the bolt passes, comprising a resilient dished washer having a hole to fit the shank of the bolt, said washer having an area greater than said elongated aperture, and a lug projecting from the concave side of said washer shaped and positioned to enter and be seated in said elongated aperture alongside the bolt.

2. Locking and sealing means for a blind bolt connection of the type having an elongated aperture through which the bolt passes, comprising a resilient dished washer having a hole to fit the shank of the bolt, said washer having an area greater than said elongated aperture, and a portion of said washer being offset toward the concave side to form a projection positioned to enter said elongated aperture alongside the bolt.

3. Locking and sealing means for a blind bolt connection of the type having an elongated aperture through which the bolt passes, comprising a resilient dished washer having a hole to fit the shank of the bolt, said washer having an area greater than said elongated aperture, and a portion of said washer being offset toward the concave side to form a projection positioned to enter said elongated aperture alongside the bolt, the outer end of said offset portion forming an abrupt shoulder to engage the edge of said aperture farthest removed from the bolt.

GUSTAV P. TORBURN.